(12) United States Patent (10) Patent No.: US 9,146,884 B2
Kumar et al. (45) Date of Patent: Sep. 29, 2015

(54) PUSH PULL ADAPTIVE CAPTURE

(75) Inventors: B. Anil Kumar, Saratoga, CA (US);
Charles Ogden, Los Gatos, CA (US);
Asael Dror, San Francisco, CA (US);
Hao Zhang, Sunnyvale, CA (US); Paul Johan Hsieh, San Jose, CA (US);
Ricardo A. Baratto, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1030 days.

(21) Appl. No.: 12/635,625

(22) Filed: Dec. 10, 2009

(65) Prior Publication Data

US 2011/0141123 A1 Jun. 16, 2011

(51) Int. Cl.
*G06F 13/14* (2006.01)

(52) U.S. Cl.
CPC ...................................... *G06F 13/14* (2013.01)

(58) Field of Classification Search
None
See application file for complete search history.

(56) References Cited

U.S. PATENT DOCUMENTS

| | | | |
|---|---|---|---|
| 5,808,662 A | 9/1998 | Kinney et al. | |
| 6,501,441 B1 | 12/2002 | Ludtke et al. | |
| 7,281,213 B2 | 10/2007 | Callegari | |
| 7,423,642 B2* | 9/2008 | Peer et al. | 345/422 |
| 7,460,725 B2* | 12/2008 | Malladi et al. | 382/240 |
| 8,453,148 B1 | 5/2013 | Hobbs | 718/102 |
| 2004/0017939 A1* | 1/2004 | Mehrotra | 382/173 |
| 2004/0181796 A1* | 9/2004 | Fedotov et al. | 719/323 |
| 2006/0146057 A1 | 7/2006 | Blythe | |
| 2006/0282855 A1 | 12/2006 | Margulis | |
| 2008/0059969 A1* | 3/2008 | Johnson | 718/104 |
| 2008/0133661 A1* | 6/2008 | Salesky et al. | 709/204 |
| 2009/0189890 A1 | 7/2009 | Corbett et al. | |
| 2010/0226441 A1* | 9/2010 | Tung et al. | 375/240.24 |
| 2010/0271365 A1* | 10/2010 | Smith et al. | 345/419 |
| 2010/0271379 A1* | 10/2010 | Byford et al. | 345/545 |
| 2014/0032735 A1* | 1/2014 | Kapoor | 709/224 |

OTHER PUBLICATIONS

Gupta, V. et al., "GViM: GPU-Accelerated Virtual Machines," ACM, *3rd Workshop on System-Level Virtualization for High Performance Computing (HPCVirt'09)*, Nuremberg, Germany, Mar. 31, 2009, 8 pages.

Segal, M. et al., "A Performance-Oriented Data Parallel Virtual Machine for GPUs," ATI Technologies, Inc., 2006, 1-6, downloaded from http://developer.amd.com/media/gpu_assets/dpvm_e.pdf.

* cited by examiner

*Primary Examiner* — Phil Hoang
*Assistant Examiner* — Mohammad H Akhavannik
(74) *Attorney, Agent, or Firm* — Danielle Johnston-Holmes; Micky Minhas

(57) ABSTRACT

In various embodiments, a screen image may be divided into rectangles, and a capture component may track changed rectangles and capture the screen upon receiving an indication. For small screen updates, the capture rate may be set to ~30 captures per second to provide a lower latency. As the screen update size increases, the capture rate may be decreased to match an allocated bandwidth. The capture rate may be increased when available bandwidth increases and decreased as bandwidth decreases. For example, the capture rate may be decreased when downstream back pressure meets predefined criteria. The capture rate change may be effected gradually to avoid jerks and jumps. Varying the capture rate by also enable audio/video synchronization with varying bandwidth variations. Some embodiments may be extended to multiple monitor solutions.

20 Claims, 13 Drawing Sheets

PUSH PULL ADAPTIVE CAPTURE

BACKGROUND

Remote computing systems can enable users to remotely access hosted resources. Servers on the remote computing systems can execute programs and transmit signals indicative of a user interface to clients that can connect by sending signals over a network conforming to a communication protocol such as the TCP/IP protocol. Each connecting client may be provided a remote presentation session, i.e., an execution environment that includes a set of resources. Each client can transmit signals indicative of user input to the server and the server can apply the user input to the appropriate session. The clients may use remote presentation protocols such as the Remote Desktop Protocol (RDP) to connect to a server resource.

In a server-based computing environment, the rendering and management of the client desktops and the subsequent transmission to the remote client requires a great deal of resources. Such resources include computational cycles, memory for frame buffers, and network bandwidth. Furthermore, current systems may not effectively address network bandwidth issues. For example, in some systems every captured frame may be compressed. If the network is congested, then frames may be dropped and queued frames may only be sent when the network resources are eventually freed. As the server scalability continues to increase, better and more efficient ways of managing this process is needed. Thus, other techniques are needed in the art to solve the above described problems.

SUMMARY

In various embodiments, methods and systems are disclosed for adjusting the rate at which graphics data is processed as a function of downstream conditions. The user experience for clients using a remote presentation session may be improved in areas such as: low latency when entering text; responsive mouse and cursor movement; responsive window pop-up, dragging, minimize and maximize; improved scroll experience on documents; synchronized audio and video; and minimization of choppy/jerky screen updates.

In an embodiment, a screen image may be divided into rectangles, and a capture component may track changed rectangles and capture the screen upon receiving an indication. For small screen updates, the capture rate may be set to ~30 captures per second to provide a lower latency. As the screen update size increases, the capture rate may be decreased to match an allocated bandwidth. The capture rate may be increased when available bandwidth increases and decreased as bandwidth decreases. For example, the capture rate may be decreased when downstream back pressure meets predefined criteria. The capture rate change may be effected gradually to avoid jerks and jumps in the rendered image. Varying the capture rate may also enable audio/video synchronization with varying bandwidth variations. Some embodiments may be extended to multiple monitor solutions.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The systems, methods, and computer readable media for altering a view perspective within a virtual environment in accordance with this specification are further described with reference to the accompanying drawings in which.

DETAILED DESCRIPTION

Computing Environments in General Terms

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 1:
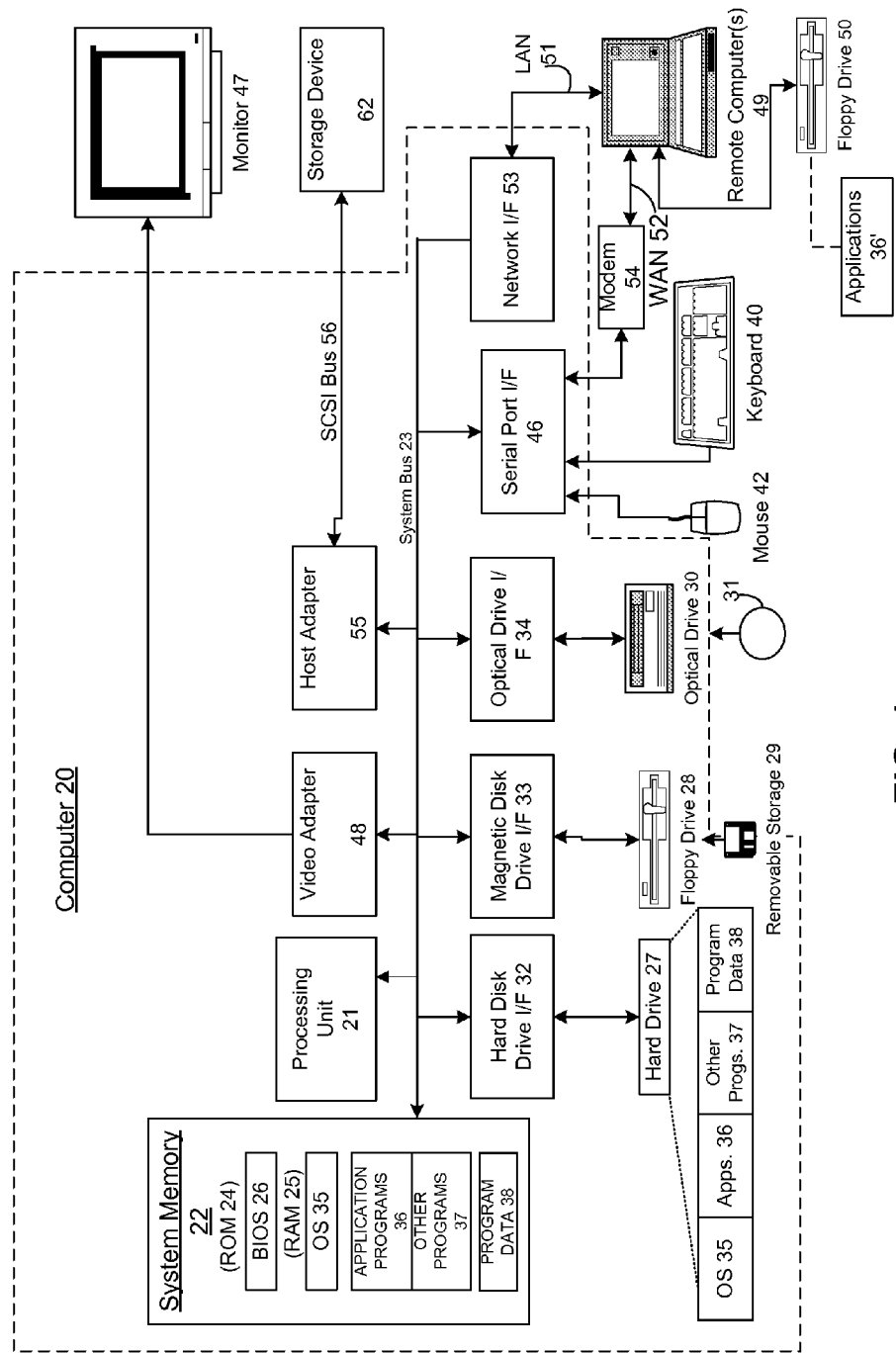
FIGS. 1 and 2 depict an example computer system wherein aspects of the present disclosure can be implemented.
Figure 2:
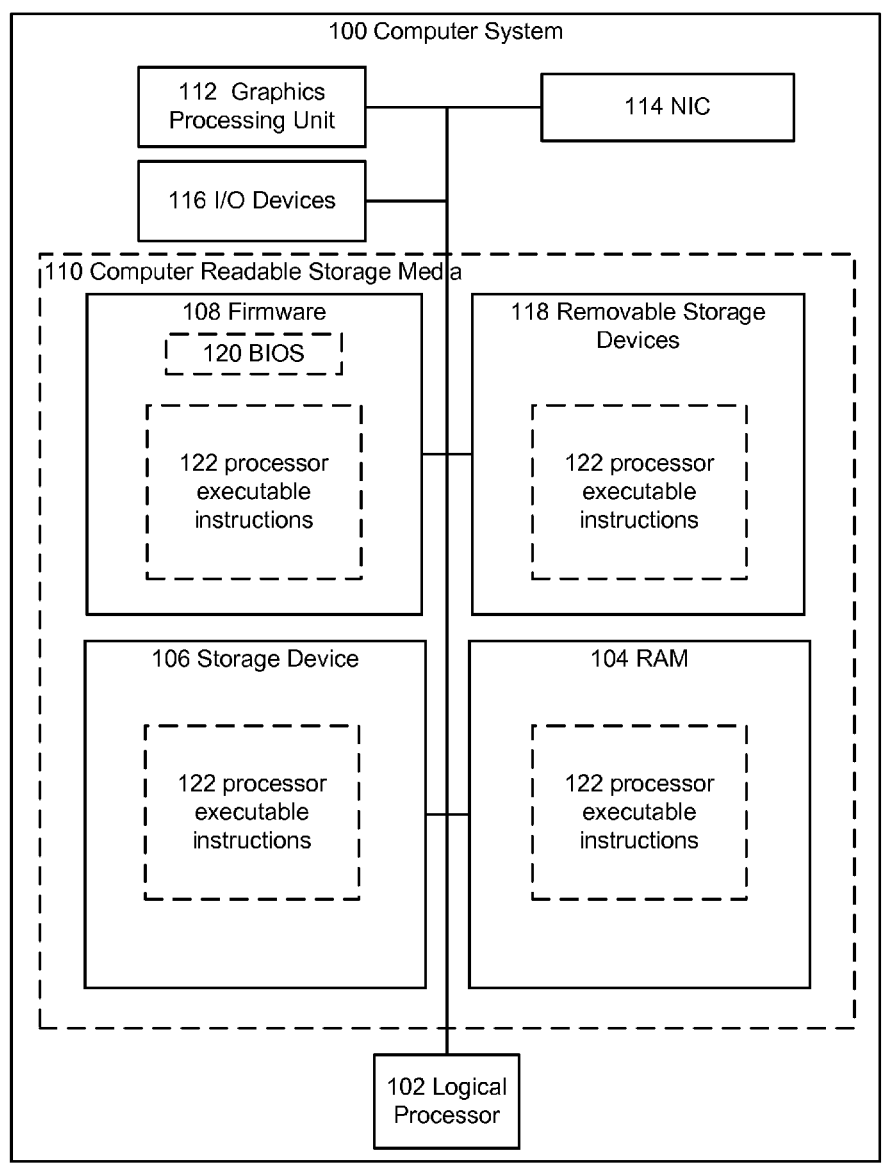

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client Embodiments may execute on one or more computers. FIGS. 1 and 2 and the following discussion are intended to provide a brief general description of a suitable computing environment in which the disclosure may be implemented. One skilled in the art can appreciate that computer systems 200, 300 can have some or all of the components described with respect to computer 100 of FIGS. 1 and 2.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Referring now to FIG. 2, another embodiment of an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges.

The computer readable storage media provide non volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 3:
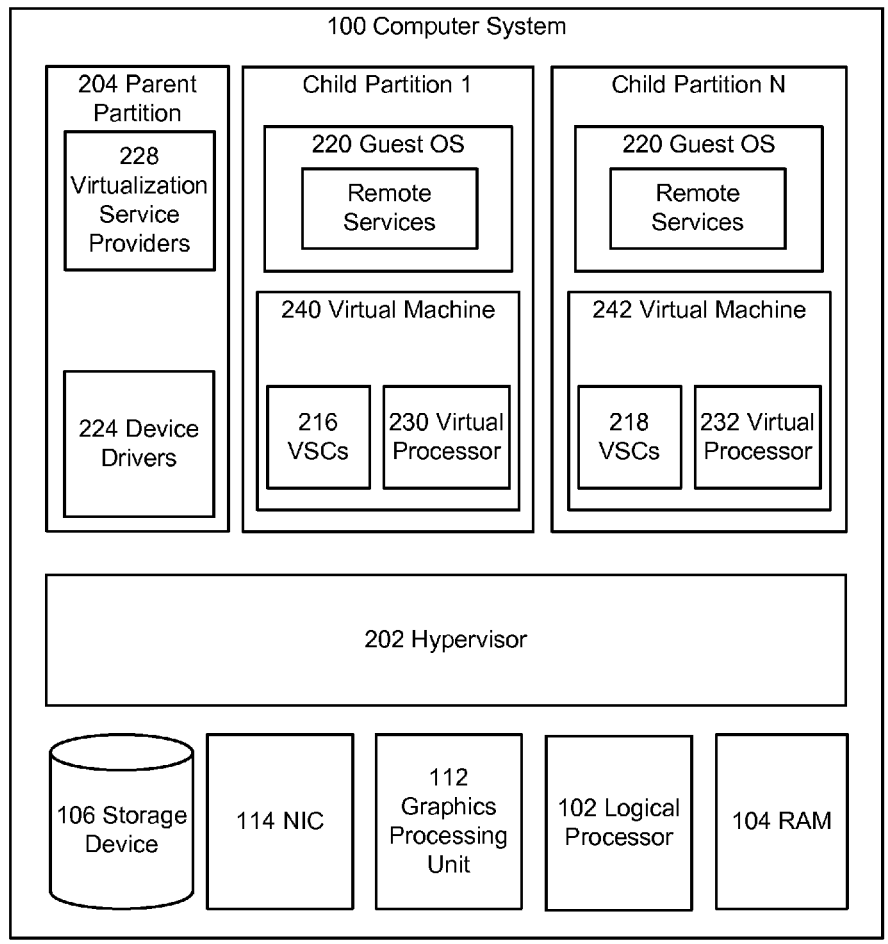
FIG. 3 depicts an operational environment for practicing aspects of the present disclosure.
Figure 4:
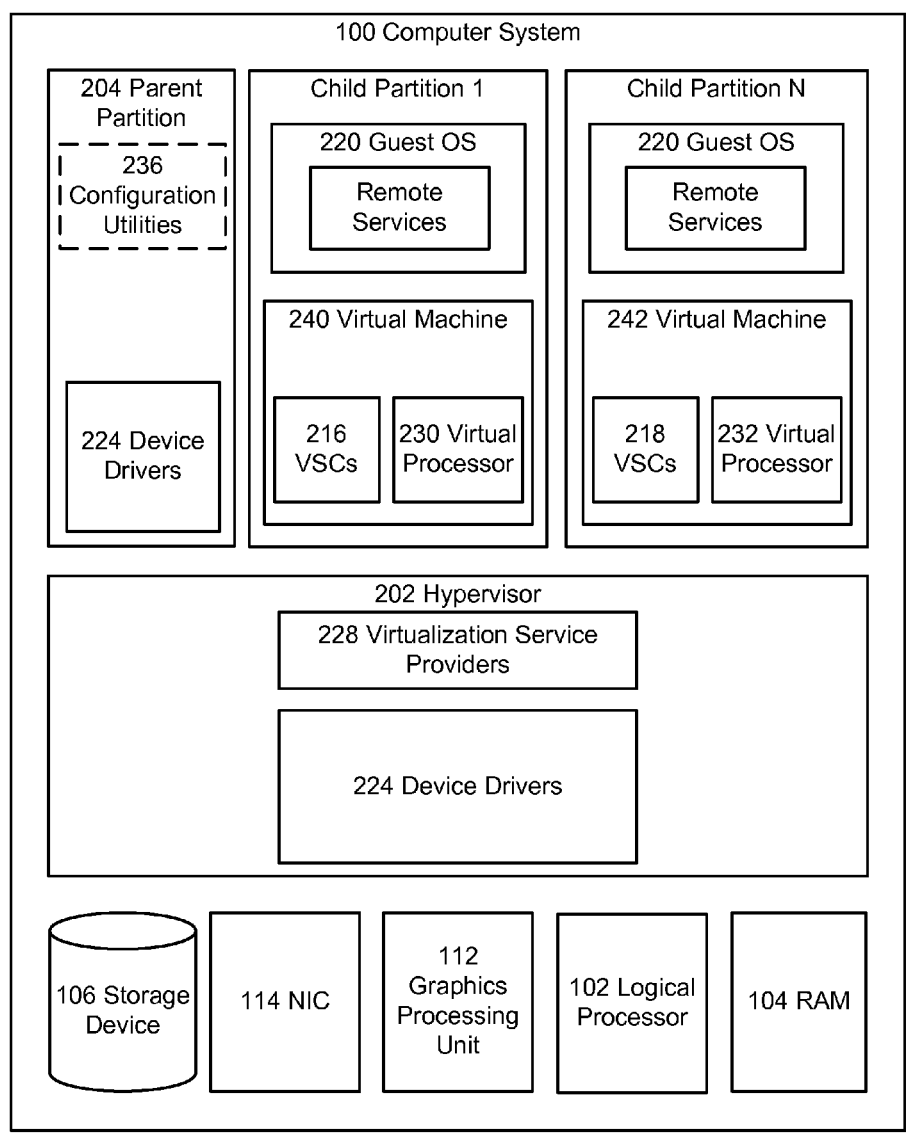
FIG. 4 depicts an operational environment for practicing aspects of the present disclosure.

Referring now to FIGS. 3 and 4, depicted are high level block diagrams of computer systems configured to effectuate virtual machines. As shown in the figures, computer system 100 can include elements described in FIGS. 1 and 2 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 100. Broadly stated, the hypervisor 202 can generate execution environments called partitions such as child partition 1 through child partition N (where N is an integer greater than or equal to 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the above example, computer system 100 includes a parent partition 204 that can also be thought of as domain 0 in the open source community. Parent partition 204 can be configured to provide resources to guest operating systems executing in child partitions 1-N by using virtualization service providers 228 (VSPs) that are also known as back-end drivers in the open source community. In this example architecture the parent partition 204 can gate access to the underlying hardware. The VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 220 through 222 can have associated file systems that can have applications stored thereon such as terminal servers, e-commerce servers, email servers, etc., and the guest operating systems themselves. The guest operating systems 220-222 can schedule threads to execute on the virtual processors 230-232 and instances of such applications can be effectuated.

Referring now to FIG. 4, illustrated is an alternative architecture that can be used to effectuate virtual machines. FIG. 4 depicts similar components to those of FIG. 3, however in this example embodiment the hypervisor 202 can include the virtualization service providers 228 and device drivers 224, and parent partition 204 may contain configuration utilities 236. In this architecture, hypervisor 202 can perform the same or similar functions as the hypervisor 202 of FIG. 2. The hypervisor 202 of FIG. 4 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 5:
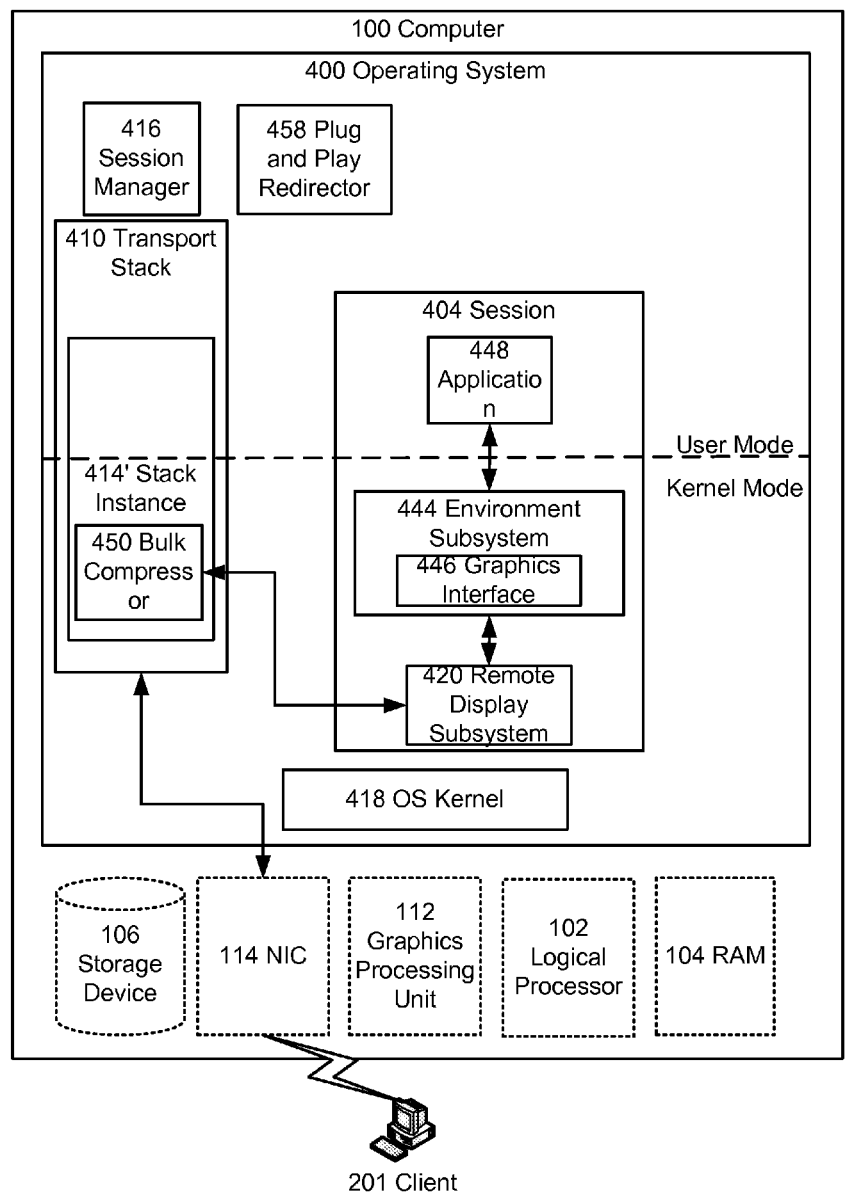
FIG. 5 illustrates a computer system including circuitry for effectuating remote desktop services.

Referring now to FIG. 5, computer 100 may include circuitry configured to provide remote desktop services to connecting clients. In an example embodiment, the depicted operating system 400 may execute directly on the hardware or a guest operating system 220 or 222 may be effectuated by a virtual machine such as VM 216 or VM 218. The underlying hardware 208, 210, 234, 212, and 214 is indicated in the illustrated type of dashed lines to identify that the hardware can be virtualized.

Remote services can be provided to at least one client such as client 401 (while one client is depicted remote services can be provided to more clients.) The example client 401 can include a computer terminal that is effectuated by hardware configured to direct user input to a remote server session and display user interface information generated by the session. In another embodiment, client 401 can be effectuated by a computer that includes similar elements as those of computer 100 FIG. 1b. In this embodiment, client 401 can include circuitry configured to effect operating systems and circuitry configured to emulate the functionality of terminals, e.g., a remote desktop client application that can be executed by one or more logical processors 102. One skilled in the art can appreciate that the circuitry configured to effectuate the operating system can also include circuitry configured to emulate a terminal.

Each connecting client can have a session (such as session 404) which allows the client to access data and applications stored on computer 100. Generally, applications and certain operating system components can be loaded into a region of memory assigned to a session. Thus, in certain instances some OS components can be spawned N times (where N represents the number of current sessions). These various OS components can request services from the operating system kernel 418 which can, for example, manage memory; facilitate disk reads/writes; and configure threads from each session to execute on the logical processor 102. Some example subsystems that can be loaded into session space can include the subsystems that generates desktop environments, the subsystems that track mouse movement within the desktop, the subsystems that translate mouse clicks on icons into commands that effectuate an instance of a program, etc. The processes that effectuate these services, e.g., tracking mouse movement, are tagged with an identifier associated with the session and are loaded into a region of memory that is allocated to the session.

A session can be generated by a session manager 416, e.g., a process. For example, the session manager 416 can initialize and manage each remote session by generating a session identifier for a session space; assigning memory to the session space; and generating system environment variables and instances of subsystem processes in memory assigned to the session space. The session manager 416 can be invoked when a request for a remote desktop session is received by the operating system 400.

A connection request can first be handled by a transport stack 410, e.g., a remote desktop protocol (RDP) stack. The transport stack 410 instructions can configure logical processor 102 to listen for connection messages on a certain port and forward them to the session manager 416. When sessions are generated the transport stack 410 can instantiate a remote desktop protocol stack instance for each session. Stack instance 414 is an example stack instance that can be generated for session 404. Generally, each remote desktop protocol stack instance can be configured to route output to an associated client and route client input to an environment subsystem 444 for the appropriate remote session.

As shown by the figure, in an embodiment an application 448 (while one is shown others can also execute) can execute and generate an array of bits. The array can be processed by a graphics interface 446 which in turn can render bitmaps, e.g., arrays of pixel values, that can be stored in memory. As shown by the figure, a remote display subsystem 420 can be instantiated which can capture rendering calls and send the calls over the network to client 401 via the stack instance 414 for the session.

In addition to remoting graphics and audio, a plug and play redirector 458 can also be instantiated in order to remote diverse devices such as printers, mp3 players, client file systems, CD ROM drives, etc. The plug and play redirector 458 can receive information from a client side component which identifies the peripheral devices coupled to the client 401. The plug and play redirector 458 can then configure the operating system 400 to load redirecting device drivers for the peripheral devices of the client 401. The redirecting device drivers can receive calls from the operating system 400 to access the peripherals and send the calls over the network to the client 401.

As discussed above, clients may use a protocol for providing remote presentation services such as Remote Desktop Protocol (RDP) to connect to a resource using terminal services. When a remote desktop client connects to a terminal server via a terminal server gateway, the gateway may open a socket connection with the terminal server and redirect client traffic on the remote presentation port or a port dedicated to remote access services. The gateway may also perform certain gateway specific exchanges with the client using a terminal server gateway protocol transmitted over HTTPS.

Figure 6:
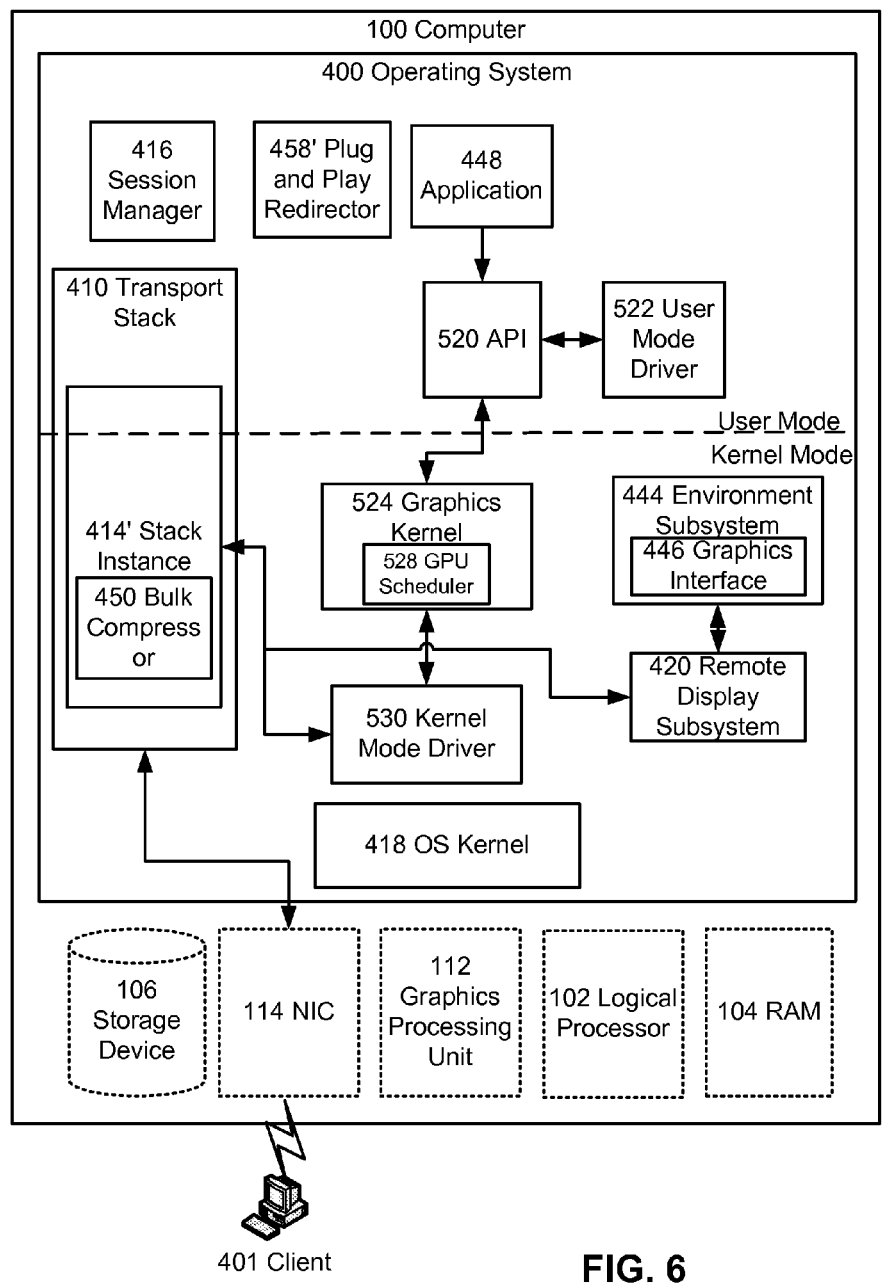
FIG. 6 illustrates a computer system including circuitry for effectuating remote services.

Turning to FIG. 6, depicted is a computer system 100 including circuitry for effectuating remote services and for incorporating aspects of the present disclosure. As shown by the figure, in an embodiment a computer system 100 can include components similar to those described in FIG. 2 and FIG. 5, and can effectuate a remote presentation session. In an embodiment of the present disclosure a remote presentation session can include aspects of a console session, e.g., a session spawned for a user using the computer system, and a remote session. Similar to that described above, the session manager 416 can initialize and manage the remote presentation session by enabling/disabling components in order to effectuate a remote presentation session.

One set of components that can be loaded in a remote presentation session are the console components that enable high fidelity remoting, namely, the components that take advantage of 3D graphics and 2D graphics rendered by 3D hardware.

3D/2D graphics rendered by 3D hardware can be accessed using a driver model that includes a user mode driver 522, an API 520, a graphics kernel 524, and a kernel mode driver 530. An application 448 (or any other process such as a user interface that generates 3D graphics) can generate API constructs and send them to an application programming interface 520 (API) such as Direct3D from Microsoft®. The API 520 in turn can communicate with a user mode driver 522 which can generates primitives, e.g., the fundamental geometric shapes used in computer graphics represented as vertices and constants which are used as building blocks for other shapes, and stores them in buffers, e.g., pages of memory. In one embodiment the application 448 can declare how it is going to use the buffer, e.g., what type of data it is going to store in the buffer. An application, such as a videogame, may use a dynamic buffer to store primitives for an avatar and a static buffer for storing data that will not change often such as data that represents a building or a forest.

Continuing with the description of the driver model, the application can fill the buffers with primitives and issue execute commands. When the application issues an execute command the buffer can be appended to a run list by the kernel mode driver 530 and scheduled by the graphics kernel scheduler 528. Each graphics source, e.g., application or user interface, can have a context and its own run list. The graphics kernel 524 can be configured to schedule various contexts to execute on the graphics processing unit 112. The GPU scheduler 528 can be executed by logical processor 102 and the scheduler 528 can issue a command to the kernel mode driver 530 to render the contents of the buffer. The stack instance 414 can be configured to receive the command and send the contents of the buffer over the network to the client 401 where the buffer can be processed by the GPU of the client.

Illustrated now is an example of the operation of a virtualized GPU as used in conjunction with an application that calls for remote presentation services. Referring to FIG. 6, in an embodiment a virtual machine session can be generated by a computer 100. For example, a session manager 416 can be executed by a logical processor 102 and a remote session that includes certain remote components can be initialized. In this example the spawned session can include a kernel 418, a graphics kernel 524, a user mode display driver 522, and a kernel mode display driver 530. The user mode driver 522 can generate graphics primitives that can be stored in memory. For example, the API 520 can include interfaces that can be exposed to processes such as a user interface for the operating system 400 or an application 448. The process can send high level API commands such as such as Point Lists, Line Lists, Line Strips, Triangle Lists, Triangle Strips, or Triangle Fans, to the API 420. The API 520 can receive these commands and translate them into commands for the user mode driver 522 which can then generate vertices and store them in one or more buffers. The GPU scheduler 528 can run and determine to render the contents of the buffer. In this example the command to the graphics processing unit 112 of the server can be captured and the content of the buffer (primitives) can be sent to client 401 via network interface card 114. In an embodiment, an API can be exposed by the session manager 416 that components can interface with in order to determine whether a virtual GPU is available.

In an embodiment a virtual machine such as virtual machine 240 of FIG. 3 or 4 can be instantiated and the virtual machine can serve as a platform for execution for the operating system 400. Guest operating system 220 can embody operating system 400 in this example. A virtual machine may be instantiated when a connection request is received over the network. For example, the parent partition 204 may include an instance of the transport stack 410 and may be configured to receive connection requests. The parent partition 204 may initialize a virtual machine in response to a connection request along with a guest operating system including the capabilities to effectuate remote sessions. The connection request can then be passed to the transport stack 410 of the guest operating system 220. In this example each remote session may be instantiated on an operating system that is executed by its own virtual machine.

In one embodiment a virtual machine can be instantiated and a guest operating system 220 embodying operating system 400 can be executed. Similar to that described above, a virtual machine may be instantiated when a connection request is received over the network. Remote sessions may be generated by an operating system. The session manager 416 can be configured to determine that the request is for a session that supports 3D graphics rendering and the session manager 416 can load a console session. In addition to loading the console session the session manager 416 can load a stack instance 414' for the session and configure system to capture primitives generated by a user mode display driver 522.

The user mode driver 522 may generate graphics primitives that can be captured and stored in buffers accessible to the transport stack 410. A kernel mode driver 530 can append the buffers to a run list for the application and a GPU scheduler 528 can run and determine when to issue render commands for the buffers. When the scheduler 528 issues a render command the command can be captured by, for example, the kernel mode driver 530 and sent to the client 401 via the stack instance 414'.

The GPU scheduler 528 may execute and determine to issue an instruction to render the content of the buffer. In this example the graphics primitives associated with the instruction to render can be sent to client 401 via network interface card 114.

In an embodiment, at least one kernel mode process can be executed by at least one logical processor 112 and the at least one logical processor 112 can synchronize rendering vertices stored in different buffers. For example, a graphics processing scheduler 528, which can operate similarly to an operating system scheduler, can schedule GPU operations. The GPU scheduler 528 can merge separate buffers of vertices into the correct execution order such that the graphics processing unit of the client 401 executes the commands in an order that allows them to be rendered correctly.

One or more threads of a process such as a videogame may map multiple buffers and each thread may issue a draw command. Identification information for the vertices, e.g., information generated per buffer, per vertex, or per batch of vertices in a buffer, can be sent to the GPU scheduler 528. The information may be stored in a table along with identification information associated with vertices from the same, or other processes and used to synchronize rendering of the various buffers.

An application such as a word processing program may execute and declare, for example, two buffers—one for storing vertices for generating 3D menus and the other one storing commands for generating letters that will populate the menus. The application may map the buffer and; issue draw commands. The GPU scheduler 528 may determine the order for executing the two buffers such that the menus are rendered along with the letters in a way that it would be pleasing to look at. For example, other processes may issue draw commands at the same or a substantially similar time and if the vertices were not synchronized vertices from different threads of different processes could be rendered asynchronously on the client 401 thereby making the final image displayed seem chaotic or jumbled.

A bulk compressor 450 can be used to compress the graphics primitives prior to sending the stream of data to the client 401. In an embodiment the bulk compressor 450 can be a user mode (not shown) or kernel mode component of the stack instance 414 and can be configured to look for similar patterns within the stream of data that is being sent to the client 401. In this embodiment, since the bulk compressor 450 receives a stream of vertices, instead of receiving multiple API constructs, from multiple applications, the bulk compressor 450 has a larger data set of vertices to sift through in order to find opportunities to compress. That is, since the vertices for a plurality of processes are being remoted, instead of diverse API calls, there is a larger chance that the bulk compressor 450 will be able to find similar patterns in a given stream.

In an embodiment, the graphics processing unit 112 may be configured to use virtual addressing instead of physical addresses for memory. Thus, the pages of memory used as buffers can be paged to system RAM or to disk from video memory. The stack instance 414' can be configured to obtain the virtual addresses of the buffers and send the contents from the virtual addresses when a render command from the graphics kernel 528 is captured.

An operating system 400 may be configured, e.g., various subsystems and drivers can be loaded to capture primitives and send them to a remote computer such as client 401. Similar to that described above, a session manager 416 can be executed by a logical processor 102 and a session that includes certain remote components can be initialized. In this example the spawned session can include a kernel 418, a graphics kernel 524, a user mode display driver 522, and a kernel mode display driver 530.

A graphics kernel may schedule GPU operations. The GPU scheduler 528 can merge separate buffers of vertices into the correct execution order such that the graphics processing unit of the client 401 executes the commands in an order that allows them to be rendered correctly.

All of these variations for implementing the above mentioned partitions are just exemplary implementations, and nothing herein should be interpreted as limiting the disclosure to any particular virtualization aspect.

Adaptive Capture

The process of compressing, encoding and decoding graphics data as referring to herein may generally use one or more methods and systems described in commonly assigned U.S. Pat. No. 7,460,725 entitled "System And Method For Effectively Encoding And Decoding Electronic Information," hereby incorporated by reference in its entirety.

In various methods and systems disclosed herein, improvements to the processing and handling of the various processes described above may be used to provide more efficient processing and thus a more timely and rich user experience. The methods and systems also provide for improvements in providing such graphics support when the network and/or system resources become congested or otherwise less available. The embodiments disclosed herein for rendering, encoding and transmitting graphics data may be implemented using various combinations of hardware and software processes. In some embodiments, functions may be executed entirely in hardware. In other embodiments, functions may be performed entirely in software. In yet further embodiments, functions may be implemented using a combination of hardware and software processes. Such processes may further be implemented using one or more CPUs and/or one or more specialized processors such as a graphics processing unit (GPU) or other dedicated graphics rendering devices.

Figure 7:
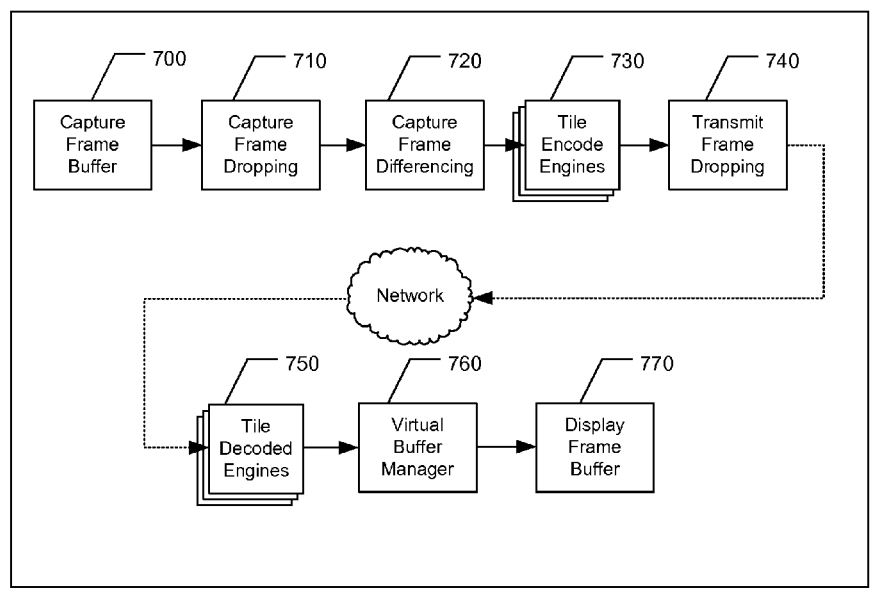
FIG. 7 illustrates an overview of some of the processes disclosed herein.

Referring to FIG. 7, illustrated is an overview of various functions associated with the rendering and encoding processes discussed herein. Various aspects of the illustrated process may be modified to improve the throughput and efficiency of the processes. Process 700 illustrates the capturing and buffering of a client frame. Process 710 illustrates that under certain circumstances it may be advantageous to drop a captured frame. The term dropping may include ignoring the captured data in favor of the next captured frame data, clearing the buffers of the captured data, and the like. Process 720 illustrates that the captured frame may be analyzed to determine if differences exist compared to the previously captured frame. Process 730 illustrates the process of encoding the changed tiles of a frame. Process 740 illustrates that under certain circumstances it may be advantageous to drop a frame that has been encoded and is ready to transmit. The term dropping may include ignoring the encoded data in favor of the next encoded frame, clearing the transmit buffers of the encoded data, and the like. Once transmitted, process 750 illustrates that the received tiles may be decoded. Process 760 illustrates that the receive buffers may be managed to track changed tiles. Process 770 illustrates that the display frame buffers may be used to drive the display controller in an efficient manner.

In an embodiment, the capture rate of the graphics source data may be adjusted in response to current system and network limitations. For example, during the course of a remote desktop application, encoded data queued for transmission may be delayed due to network congestion. The continued queuing and delay of the transmissions may result in data being lost when the transmit buffers become full and new data is not stored. Likewise, if the new data is not merged with existing data, the new data may be lost and the queued data, once transmitted, may be stale due to the transmit delay. When a new frame is transmitted after one or more frames have been lost due to the network congestion, the result may be a jerky or otherwise poor quality video on the client side.

In one embodiment, a capture component may be configured to track changed rectangles and upon receiving an indication to capture, capture the screen. The capture component may be part of a render/capture/compress subsystem. In one embodiment, the capture rate may be adjusted as a function of the amount of changes on the user screen. For example, for small screen updates, the capture rate may be set at ~30 captures per second. Keeping in mind that captured screens are analyzed and that only the changed areas are compressed and transmitted, then it can be seen that a captured screen with only a small amount of change will result in, for example, one screen tile being identified as a changed tile. Since the number of tiles to be compressed is small and the resulting latency is expected to be small, then the best user experience may be achieved by using a higher capture rate. An example of when a user screen may exhibit small screen changes is when a user is typing and only a small screen area is being updated to reflect the typed characters.

As the update size increases, the capture rate may be decreased, if necessary, to match the allocated bandwidth. Similarly, the capture rate may be increased if the system determines that more bandwidth is available. For example, if the downstream back pressure results in the client being unable to pull or consume the captured and compressed screen updates, then the capture rate may be decreased.

In various embodiments, the capture rate change may be gradually effected in order to avoid sudden changes and thus cause undesired effects on the user screen such as a jerky image.

The implementation of the disclosed subject matter may allow for an improvement of the user experience by providing the capability of dynamically adjusting the capture rate and minimizing the effects of network constraints on the user experience. For example, the techniques herein may enable audio video synchronization with varying network bandwidth variations.

Figure 8:
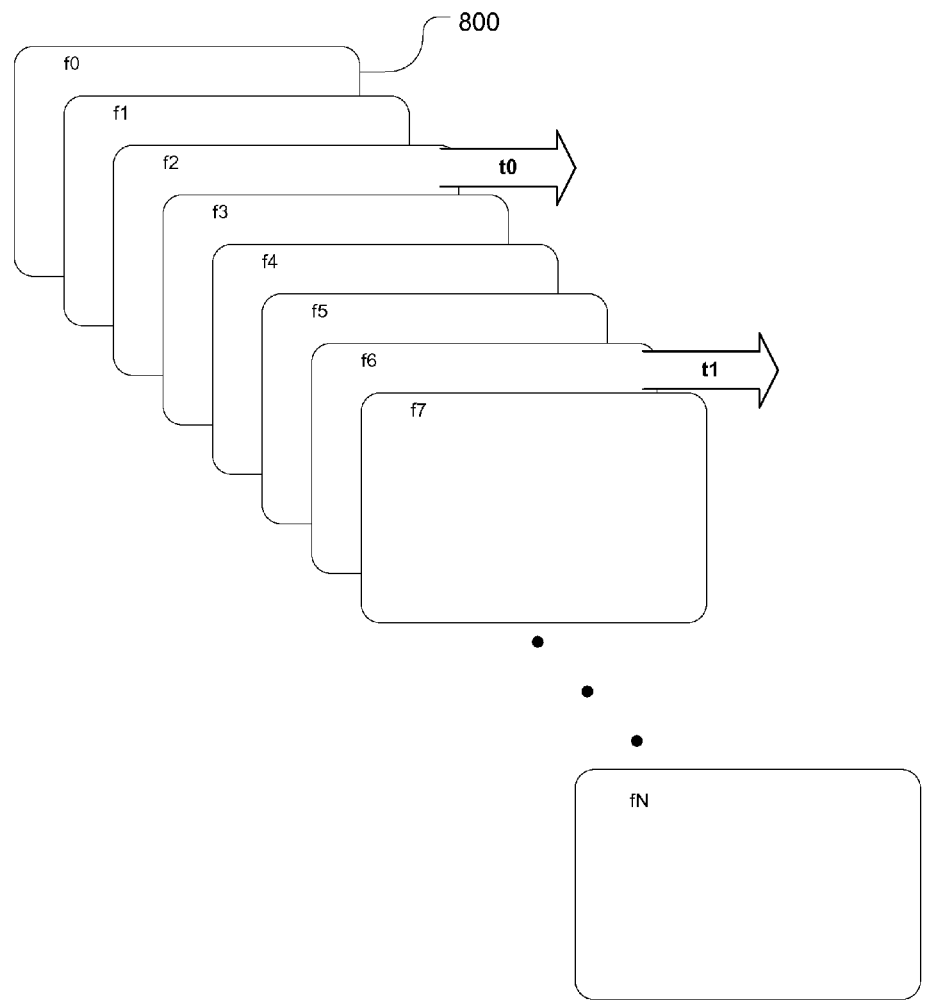
FIG. 8 illustrates an example of a frame capture sequence.

The capture component of the render/capture/compress function may filter calls directed to the video driver and make determinations to capture screen information. Referring to FIG. 8, illustrated is an example scenario describing frame capture events. Depicted are a series of epochs 800 F0 to FN during which frame data may be captured. At time t0, a first capture may be taken. At t1, a second capture may be taken. During the first capture at t0, the entire screen may be captured. Since no previous captures have been taken, all of the tiles or rectangles that together form the entire screen may be compressed and transmitted. At t1 only the changes need be captured and/or compressed and tracked. The list of changed rectangles then define the scope or boundary of the screen update.

In one embodiment, a two-level mechanism may be used to determine the scope of the screen changes and to track the changes. At a first level, the captured screen may be divided into one or more rectangles or tiles of a predetermined size that generally includes a region of the screen that has changed since a previous screen capture. Certain features that change on a screen need not to be captured at every available epoch.

The screen change information may be accumulated and tracked. When a screen update is to be transmitted for rendering, the accumulated changes may be sent to a graphics plug-in which may compress the received data and the compressed data may then be made available to the corresponding virtual machine and ultimately to the client device for rendering on a user screen. By sending only the changed screen areas (or changed rectangles), the required bandwidth for transmitting the screen data to the client may be reduced. Another method may include compressing the data representing the changed rectangles. Finally, within the changed rectangles, only the areas within the rectangle that are changed can be compressed and transmitted.

When sending data to a remote client, it is a common experience that due to network congestion, the client is unable to received the data that is transmitted. In this case it may not be beneficial to capture and compress data that the downstream user is unable to receive and process. The render/capture/compress subsystem can stop capturing data and avoid performing compression tasks, freeing up resources for other purposes.

Various methods may be used to determine whether the downstream user is able to receive and process data. For example, if buffers are being used to receive changed rectangle information, then a capture may be initiated when a buffer becomes available for receiving data. By monitoring the client's apparent ability to pull the captured data, decisions can be made as to how to provide good quality images over a connection of varying capacity. It is desirable to minimize the latency between user actions and the resulting screen changes, and in order to facilitate this objective, in some cases it may be preferable to increase the capture rate. For example, if it is determined that the screen changes are small, then one can make certain assumptions about the user's activity. For example, it can be assumed that the user is currently typing and only a small portion of the screen is changing at a given time. In this case, the system can automatically increase the capture rate. If the bounding rectangles that define the scope of changes become larger, then the system can maintain the current capture rate or back off the current capture rate to avoid a particular virtual machine from consuming too much of the total available bandwidth.

In an embodiment, if the bounding rectangle increases in size, a lookup table may be used to determine whether the capture rate should be adjusted and if so, a corresponding new capture frame rate or a target capture rate range. Generally, the periodic capture rate may be increased or decreased based on the pull rate at the user buffer. The lookup table information and the buffer pull rate may be used together to determine a desired capture rate. The capture rate can use a number of predetermined factors such as, for example, policies that balance the needs of the individual users and the overall balance and operation of the system as a whole.

In an embodiment, if the amount of changes on the screen or rectangle are small, then the system may determine to capture frames at a normal or fast rate. In keeping with the objective to minimize user latency, in this case the overall latency may be minimized by skipping the compression step as sending the raw data may be more efficient and consume less end-to-end time compared to the time required to include computational cycles needed to compress the data prior to transmission.

Thus in various embodiments, an adaptive capture rate can be provided in order to provide the best user experience under an available bandwidth. If a network develops congestion issues, then image data and commands may get backlogged and in many cases the system may need discard data until the system can catch up. Undesirable effects may result such as jumping and audio popping which detracts from the user's experience. By intelligently adjusting the capture rate as disclosed herein, such undesirable effects can be minimized or avoided and the user's experience may be enhanced.

Figure 9:
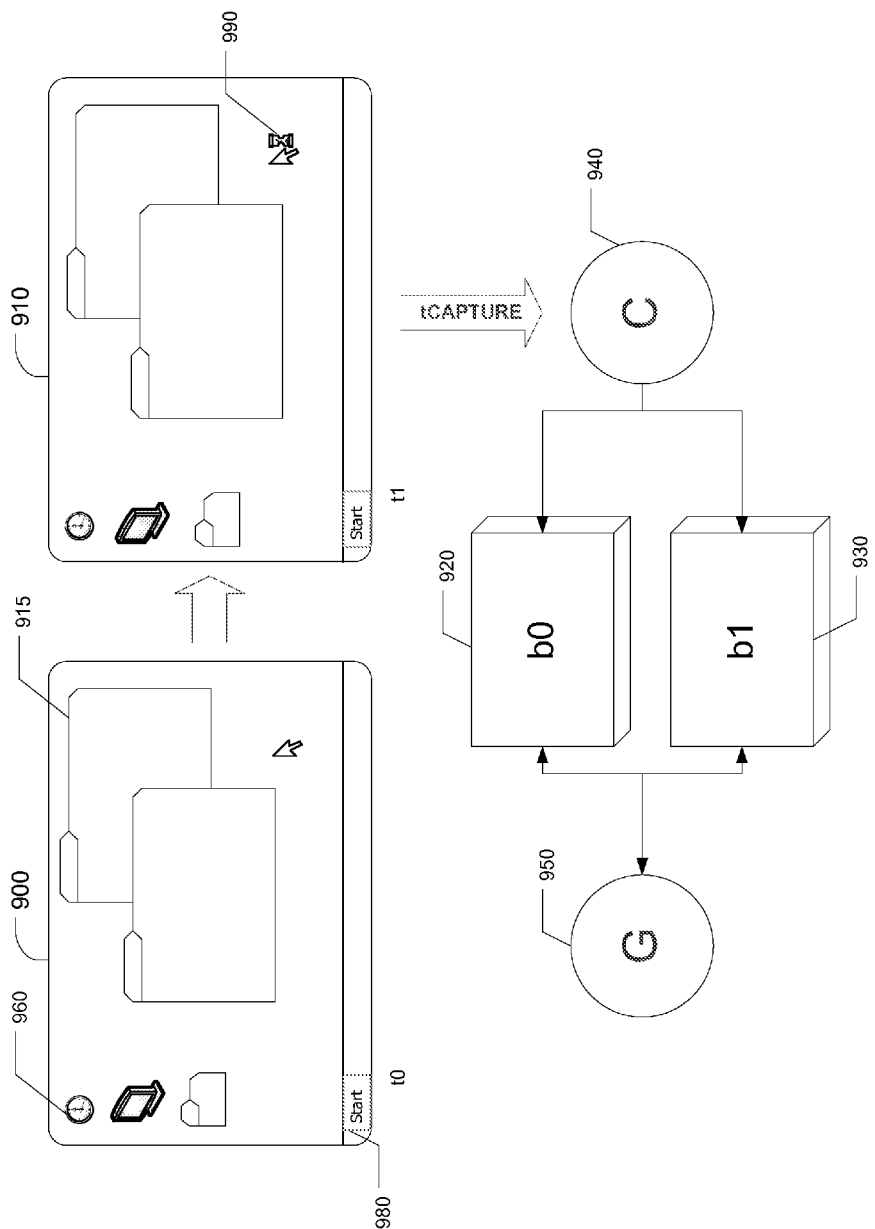
FIG. 9 illustrates an example architecture incorporating aspects of the methods disclosed herein.

Referring to FIG. 9, illustrated is a user screen 900 including a start button 980, icons 960, and one or more user application windows 915. Various areas of the screen may be updated arbitrarily and various threads may be active for updating various user screens. A capture component 940 may access the video memory and determine threads that are updating the screen. If it is determined that a screen has been updated, then the current screen can be captured. In an embodiment, a capture thread may be provided that provides a signal when a screen is updated. The signal may also invoke a process that compresses what is captured and places the compressed data into buffers 920 and 930. If two buffers are used then the use of the buffers will alternate, in this case between b0 and b1.

A graphic source 950 may be another thread that can pull from one of the buffers 920 or 930 while the other buffer is reserved for receiving data. When a change in a screen is detected, the system may determine whether a buffer available. If there is no buffer available than it may be determined that data is being pushed faster than the buffers are being accessed and their contents processed. In this case, the screen changes need not be compressed and uploaded to the buffers. Changed rectangles may be accumulated and tracked so that the changes may be compressed and uploaded at the next opportunity.

By implementing the above techniques, a remote user's experience may be enhanced during situations in which the network availability varies. The experience of tearing and popping may be avoided, and capture frame rate may be adjusted so that CPU/GPU cycles will not be wasted.

As discussed above, a throttling mechanism can be provided to maintain the user experience during a remote presentation session. At the point where the data is being provided to the graphic source, the system may track how fast the data is being consumed based on the current settings and determine whether the next batch of updates can be sent. By using such a mechanism, the system needs only to determine how fast the data is being consumed and does not need to look further down the pipeline.

The throttling mechanism may be based on the size of the updates. If a small area of the screen is changed such as the cursor, then the system may determine that it need not compress the data. In such cases the latency of the compressing process may be greater than just sending the raw data. This determination may performed by the compression function. Various other policies can be applied to determine a throttling rate. For example, a limit may be placed on the maximum throttle rate to prevent high power users performing intense graphics applications from using too much of the available total bandwidth.

Thus the snapshot interval may be adjusted wherein the frame update push rate may be dynamically adjusted based on the pull rate by the graphics source. The push rate may be further modified based on a policy. For example, if only a small number of the tiles are changed, then the capture rate can be increased, decreased, or remain unchanged depending on the objectives and needs of the system.

In one embodiment, the image frame capture may be implemented in four stages. In a first stage, cursor shape changes may be tracked. In a second stage, on-screen changes can be tracked as they occur in the host partition. In a third stage, a copy of the screen changes can be saved and transferred to system memory. The data can be compressed if compression is enabled. In a fourth stage, the cursor and graphics updates can be transmitted to the remote presentation graphics source.

Figure 10:
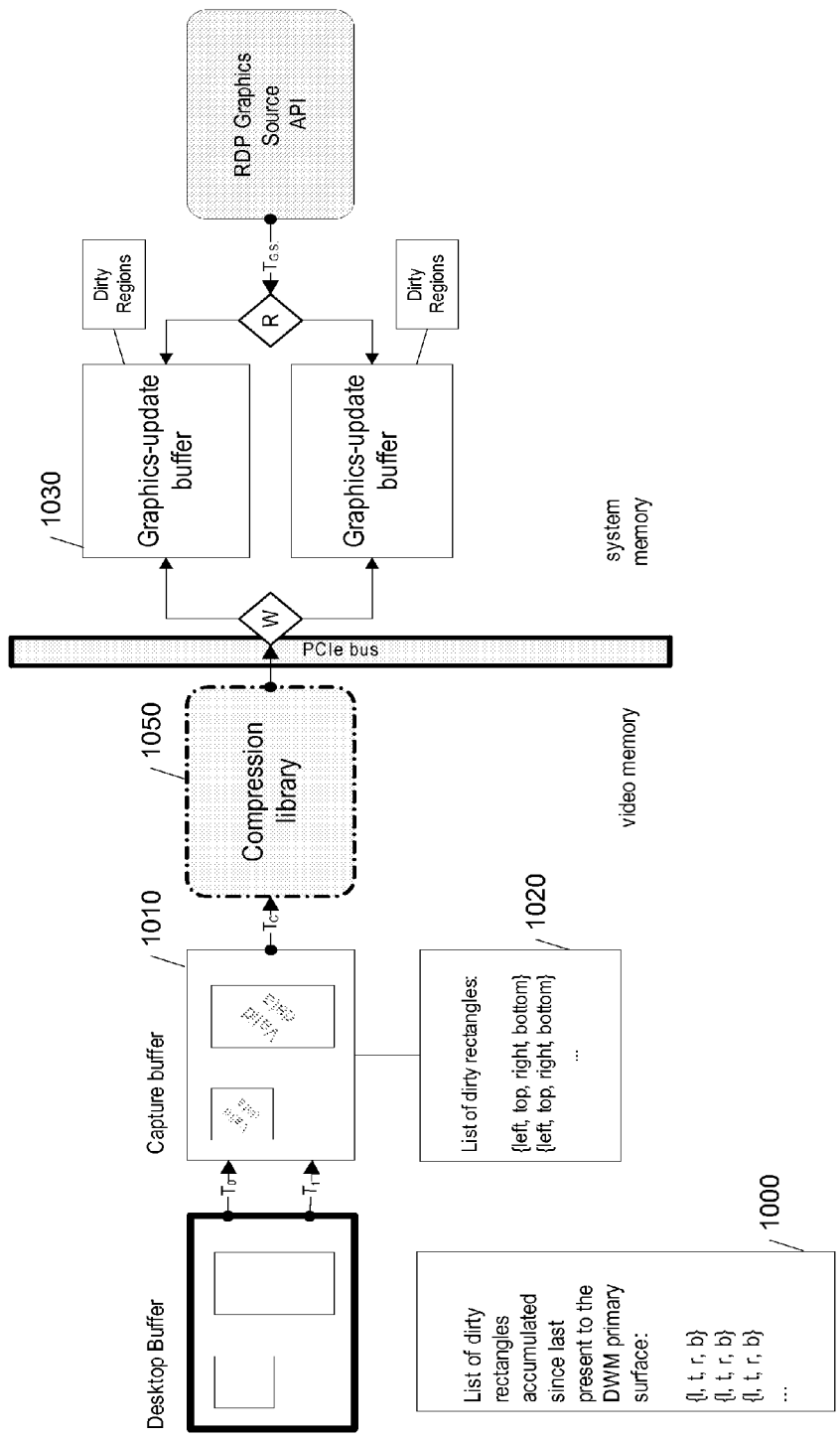
FIG. 10 illustrates an example architecture incorporating aspects of the methods disclosed herein.

FIG. 10 is an exemplary illustration depicting various components of a capture subsystem and some of the methods disclosed herein. List 1000 depicts a list of "dirty" (changed) rectangles on the primary surface that is accumulated by monitoring the command flow from the virtual display drivers on the virtual machine to the drivers on the host partition. The virtual display drivers may comprise user mode drivers and kernel mode drivers.

Buffer 1010 depicts a video memory capture buffer used to hold dirty rectangles accumulated from the primary surface being rendered on the host partition. The buffer may hold the data until the capture thread can process the data in preparation for sending the data back to the remote presentation graphics source.

List 1020 depicts a list of dirty rectangles contained in the video memory capture buffer 1010. Buffers 1030 depict two system memory graphics update buffers in system memory along with the associated dirty rectangle regions. The results may be double buffered in order to provide the remote presentation graphics source one buffer while generating the next buffer.

In one embodiment, the GVM or host partition may be a Direct3D application. The GVM may be viewed as a virtual GPU that natively executes Direct3D commands. When the GVM creates the primary surface for a DVM (or child virtual machine), the GVM may also construct a capture object which is configured to create the video memory capture buffer 1010. The capture buffer 1010 may provide a location from which the capture thread can asynchronously transfer or transfer/compress a batch of dirty rectangles into one of the system memory graphics update buffers 1030. The results may then be sent to the remote presentation graphics source at a predetermined rate based on the total area of the dirty rectangles. In this way a DVM can be prevented from consuming more than its allocated share of available bandwidth. The system memory graphics update buffers 1030 may be double buffered to allow some overlap in transmitting one set of updates to the remote presentation graphics source while generating the next set of updates.

In the GVM, various Direct3D entry points may be configured to keep track of dirty rectangles on the desktop primary surface. The list of rectangles 1000 may accumulate until an indication to the desktop primary surface is received and a system memory capture buffer is available to receive compressed graphics updates. At the time of the indication to the primary surface, one of the following three states may be active:

1. The video memory capture buffer 1010 is available for use and a system memory graphics update buffer 1030 is available. In this case, the following steps may be performed:
    1. Copy the pixels from the dirty rectangles into the capture buffer 1010.
    2. Remove the dirty rectangles from list 1000 to list 1020 which is associated with the capture buffer 1010.
    3. Mark the capture buffer 1010 as "In Use."
    4. Signal the capture thread to activate and transfer the contents of the capture buffer 1010 into a system memory graphics update buffer 1030. If compression is enabled, the system memory graphics update buffer 1030 may receive the compressed version of the video memory capture buffer 1010. The data may be compressed using a codec from the compression library 1050. The capture thread may clear the "In Use" flag when it has completed compressing the contents of the capture buffer.
2. The video memory capture buffer 1010 is marked as "In Use." In this case, the system may continue to accumulate dirty rectangles until the next indication to the primary surface.
3. If the video memory capture buffer 1010 is available but neither system memory graphics update buffer 1030 is available, then the system may continue to accumulate dirty rectangles until the next indication to the primary surface.

When the capture thread is invoked, the following actions may be performed:
1. Analyze the list of dirty rectangles 1020 associated with the video-memory capture buffer 1010 to reduce the list to a list of non-overlapping rectangles to avoid processing of overlapping regions and thus processing regions more than once.
2. Use a codec to compress the dirty regions in the video memory capture buffer 1010 into the next available system memory graphics update buffer 1030 based on an associated write index.
3. Store the list of non-overlapping dirty rectangles with the graphics update buffer 1030.
4. Mark the video memory capture buffer 1010 as not "In Use."
5. Mark one of the system memory graphics update buffers 1030 as "full" and toggle a write index to point to the second buffer.
6. Signal the capture server thread (i.e., the thread that communicates with the remote presentation graphics source) that there is data to be sent to the graphics source.
7. Idle the capture server thread until it is signaled that the video memory capture buffer 1010 contains new data to be processed.

When the capture server thread is activated, and if the remote presentation graphics source is ready to accept data, then one of the following actions may be performed:
1. If the cursor on the presentation surface has changed, send the new cursor shape.
2. If the system memory graphics update buffer 1030 contains data that is ready to be sent, check the area of the dirty rectangles and perform one of the following;
    a. If the total area of the dirty regions is ¼th or less of a 1280×1024 resolution screen, then send the updates to the remote presentation graphics source.
    b. The capture rate may be determined based on Table 1 below. In one embodiment, the system may be configured to throttle larger screen updates to ~12 frames per second to keep any one virtual machine from consuming too much bandwidth from the server. The capture policy can vary with capture/sample rates.

TABLE 1

| Screen change | Capture/Sample rate goal |
|---|---|
| 10% or below | ~30 fps |
| 10%-25% | ~12-30 fps |
| 25%-50% | ~6 fps |
| >50% | 3+ fps |

When the capture server thread wakes, and if the remote presentation graphics source is not ready to accept data, then the capture server thread can idle until one of the following occurs:
1. The capture server thread is signaled that the graphics update buffer(s) 1030 contain data ready to be sent to the graphics source.
2. The capture server thread is signaled that the graphics source is ready to receive more data.
3. A throttle sleep time has elapsed.

A number of methods can be used to determine changed or dirty rectangles. In one embodiment, Direct 3D rendering may be tracked by monitoring API entry points including the following:
   a. SetScissorRect( )—Keep track of the scissor rectangle
   b. SetRenderState( )—Keep track of whether the scissor rectangle is enabled
   c. SetViewport( )—Keep track of the viewport
   d. DrawPrimitive( ), DrawIndexedPrimitive( ), DrawPrimitive2( ), DrawIndexedPrimitive2( ), DrawIndexedPrimitiveUP( )—Use the current viewport and scissor rectangle information to determine which portions of the primary surface will be dirty and add them to the list of dirty rectangles. Redundant rectangles, and rectangles that fall inside of existing dirty rectangles, are not added. For example, video playback in a stationary window will not generate multiple dirty rectangles.
   e. LockRect( )/UnlockRect( )—Keep track of locks of rectangles on the primary surface if the lock flags indicate that the lock was not a read-only lock.

Graphics Device Interface (GDI) rendering may be performed by the CPU on the DVM (child partition) and may arrive at the GVM (host partition) as a list of one or more rectangles. This rectangle list may be added to the list of dirty rectangles.

The above described techniques may be applied to multiple monitor scenarios. The capture component may, for example, determine the number of video presentation paths from the video presentation network information as maintained by the virtual GPU component. Each video presentation source may be provided with a set of capture buffers as described above. Each indication that a screen change has been detected may be associated with a specific video source and may cause the capture component to pass the associated graphics updates through the buffers associated with that video source. Screen change indications for a set of displays may arrive asynchronously. It may also be the case that a particular display has no active applications and receives fewer indications than another display. Graphics updates may be sent to the remote presentation graphics source as they become available rather than waiting for updates to be available for each of the displays.

Figure 11:
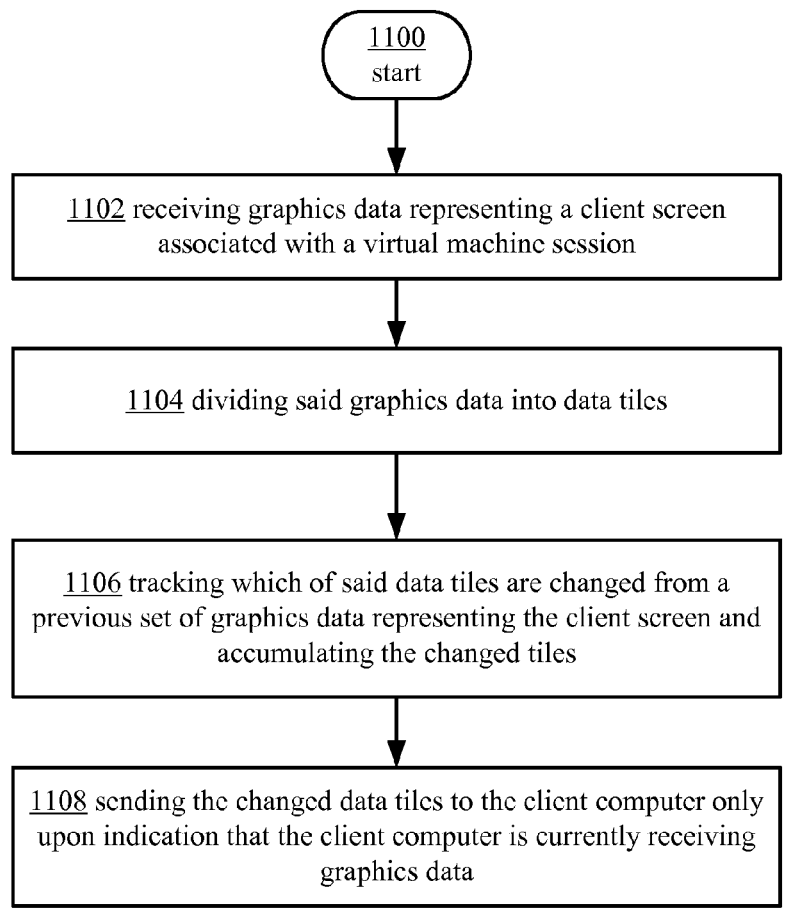
FIG. 11 illustrates an example of an operational procedure for processing graphics data for transmission to a client computer.

FIG. 11 depicts an exemplary operational procedure for processing graphics data for transmission to a client computer including operations 1100, 1102, 1104, and 1106. Referring to FIG. 11, operation 1100 begins the operational procedure and operation 1102 illustrates receiving graphics data representing a client screen associated with a virtual machine session. Operation 1104 illustrates dividing said graphics data into data tiles. Operation 1106 illustrates tracking which of said data tiles are changed from a previous set of graphics data representing the client screen and accumulating the changed tiles. Operation 1108 illustrates sending the changed data tiles to the client computer only upon indication that the client computer is currently receiving graphics data.

Figure 12:
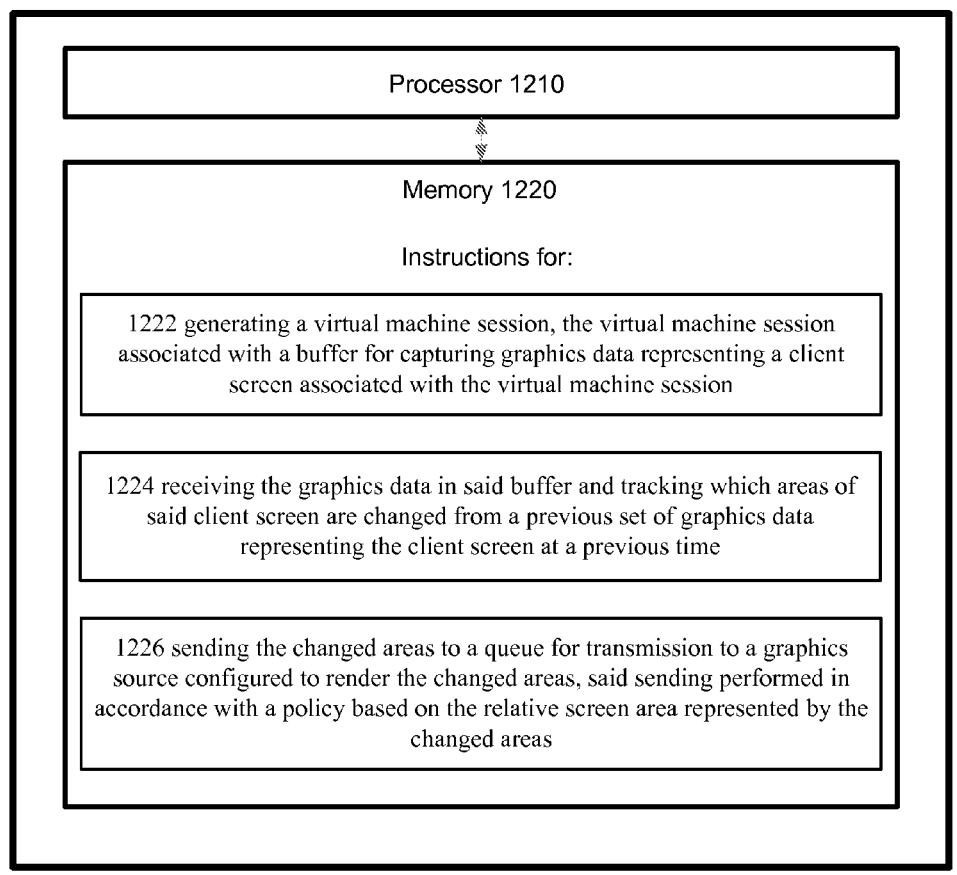
FIG. 12 illustrates an example system for processing graphics data for transmission to a client computer.

FIG. 12 depicts an exemplary system for processing graphics data for transmission to a plurality of client computers as described above. Referring to FIG. 12, system 1200 comprises a processor 1210 and memory 1220. Memory 1220 further comprises computer instructions configured to process graphics data for transmission to a plurality of client computers. Block 1222 illustrates generating a virtual machine session, the virtual machine session associated with a buffer for capturing graphics data representing a client screen associated with the virtual machine session. Block 1224 illustrates receiving the graphics data in said buffer and tracking which areas of said client screen are changed from a previous set of graphics data representing the client screen at a previous time. Block 1226 illustrates sending the changed areas to a queue for transmission to a graphics source configured to render the changed areas, said sending performed in accordance with a policy based on the relative screen area represented by the changed areas.

Figure 13:
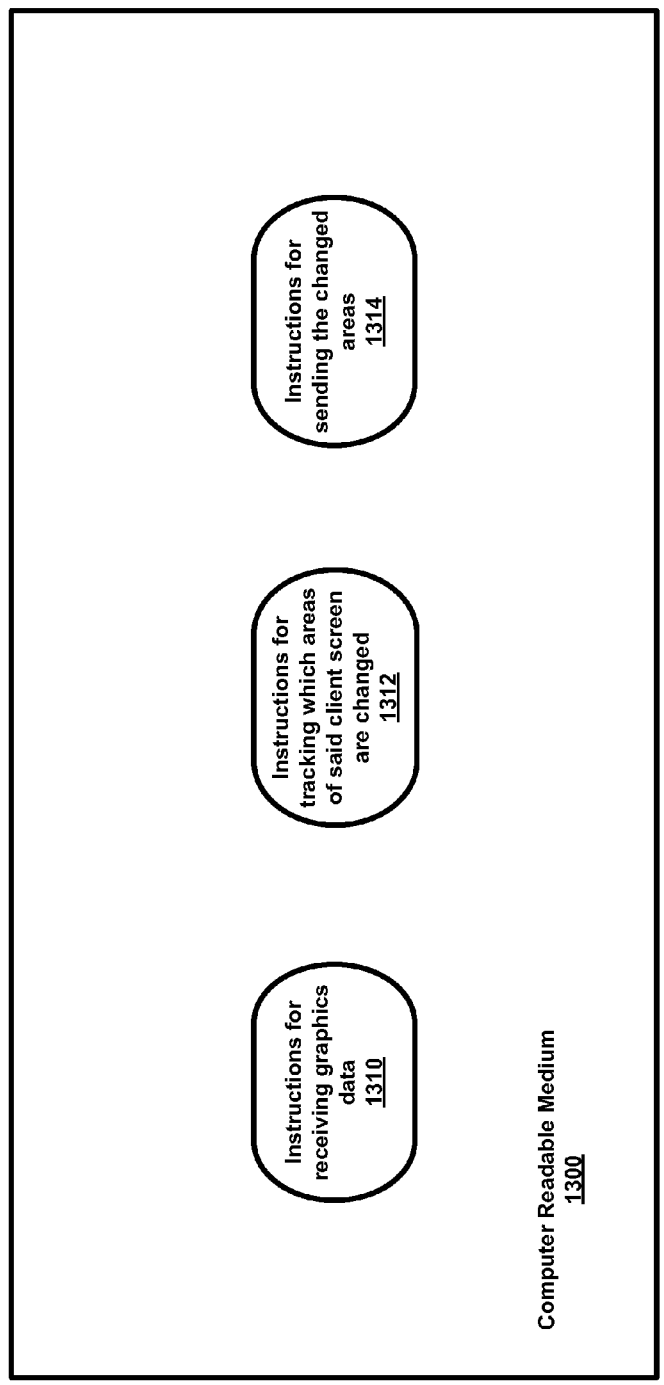
FIG. 13 illustrates a computer readable medium bearing computer executable instructions discussed with respect to FIGS. 1-12.

Any of the above mentioned aspects can be implemented in methods, systems, computer readable media, or any type of manufacture. For example, per FIG. 13, a computer readable medium can store thereon computer executable instructions for processing graphics data for transmission to a plurality of client computers. Such media can comprise a first subset of instructions for receiving graphics data representing a client screen associated with a virtual machine session 1310; a second subset of instructions for tracking which areas of said client screen are changed from a previous set of graphics data representing the client screen and accumulating the changed areas 1312; and a third subset of instructions for sending the changed areas to a queue for transmission to a graphics source configured to render the changed areas, said sending performed in accordance with a policy based on the relative screen area represented by the changed areas, said sending only performed upon indication that the graphics source is currently capable of receiving graphics data 1314. It will be appreciated by those skilled in the art that additional sets of instructions can be used to capture the various other aspects disclosed herein, and that the three presently disclosed subsets of instructions can vary in detail per the present disclosure.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. In a system comprising a processor and memory, a method for processing graphics data for transmission to a remote client computer, the method comprising:
  receiving graphics data representing a client screen associated with a virtual machine session, wherein the virtual machine session is associated with a buffer for capturing the graphics data representing the client screen;
  dividing said graphics data into data tiles;
  tracking which of the data tiles are changed from a previous set of graphics data representing the client screen, wherein the tracking is performed at an adaptive capture rate that is adjusted based at least in part on an indication of a rate of data consumption by the remote client computer and a number of changed data tiles, wherein the adaptive capture rate is decreased for an increased number of changed data tiles, and wherein the adaptive capture rate is increased for a decreased number of changed data tiles;
  accumulating the changed data tiles; and
  sending the changed data tiles to the remote client computer upon indication that the remote client computer is currently capable of receiving graphics data.

2. The method of claim 1, wherein the adaptive capture rate is further based at least in part on a predetermined capture rate.

3. The method of claim 2, wherein said predetermined capture rate is based on a policy.

4. The method of claim 3, wherein said policy comprises sending the changed data tiles when the changed data tiles represent a cursor change.

5. The method of claim 3, wherein said policy comprises:
when the screen area represented by said changed data tiles is 25% or less, then sending the changed data tiles.

6. The method of claim 3, wherein said policy comprises a lookup table.

7. The method of claim 3, wherein said policy comprises:
when the screen area represented by said changed data tiles is 10% or less, then setting the predetermined capture rate at 30 frames per second or greater.

8. The method of claim 3, wherein said policy comprises:
when the screen area represented by said changed data tiles is between 10% and 25%, then setting the predetermined capture rate in a range of 12 to 30 frames per second.

9. The method of claim 3, wherein said policy comprises:
when the screen area represented by said changed data tiles is between 25% and 50%, then setting the predetermined capture rate in a range of 6 to 12 frames per second.

10. The method of claim 3, wherein said policy comprises:
when the screen area represented by said changed data tiles is greater than 50%, then setting the predetermined capture rate in a range of 3 to 6 frames per second.

11. The method of claim 1, wherein said tracking is performed upon receiving an indication of change on the client screen.

12. The method of claim 1, further comprising:
for each of the changed data tiles:
processing said data tiles into tile components; and
encoding the tile components to produce encoded data outputs.

13. The method of claim 1, wherein said sending the changed data tiles comprises transferring the changed data tiles to a buffer communicatively coupled to a mechanism configured for said sending.

14. The method of claim 1, wherein said changed data tiles are non-overlapping.

15. A system configured to process graphics data for transmission to a plurality of remote client computers, comprising:
at least one processor; and
at least one memory communicatively coupled to said at least one processor, the memory having stored therein computer-executable instructions for:
generating a virtual machine session, the virtual machine session associated with a buffer for capturing graphics data representing a client screen associated with the virtual machine session;
receiving the graphics data in said buffer;
tracking areas of the client screen that are changed from a previous set of graphics data representing the client screen at a previous time, wherein the tracking is performed at an adaptive capture rate that is adjusted based at least in part on an indication of a pull rate for at least one of the plurality of remote client computers, and wherein the adaptive capture rate is increased when there are less changed areas and decreased when there are more changed areas; and
sending the changed areas to a queue for transmission to a graphics source configured to render the changed areas, said sending performed in accordance with a policy based on the relative screen area represented by the changed areas.

16. The system of claim 15, wherein said sending is only performed upon indication that the graphics source is currently capable of receiving graphics data.

17. The system of claim 15, wherein the adaptive capture rate is further based at least in part on a predetermined capture rate.

18. The system of claim 15, wherein said changed areas comprise one or more rectangles.

19. The system of claim 15, further comprising compressing said graphics data prior to said sending.

20. A computer readable storage device storing thereon computer executable instructions for processing graphics data for transmission to a plurality of remote client computers, said instructions for:
receiving graphics data representing a client screen associated with a virtual machine session;
tracking areas of said client screen that are changed from a previous set of graphics data representing the client screen, wherein the tracking is performed at an adaptive capture rate that is adjusted based at least in part on an indication of a rate of data consumption by at least one of the plurality of remote client computers, and wherein the adaptive capture rate is increased when there are less changed areas and decreased when there are more changed areas;
accumulating the changed areas; and
sending the changed areas to a queue for transmission to a graphics source configured to render the changed areas, said sending performed in accordance with a policy based on the relative screen area represented by the changed areas, said sending only performed upon indication that the graphics source is currently capable of receiving graphics data.

* * * * *